United States Patent
Kärnä

(10) Patent No.: US 7,023,903 B2
(45) Date of Patent: Apr. 4, 2006

(54) METHOD OF RECEIVING SPREAD SPECTRUM SIGNAL, AND RECEIVER

(75) Inventor: Juha Kärnä, Espoo (FI)

(73) Assignee: Nokia Corporation, Espoo (FI)

( * ) Notice: Subject to any disclaimer, the term of this patent is extended or adjusted under 35 U.S.C. 154(b) by 301 days.

(21) Appl. No.: 10/171,382

(22) Filed: Jun. 14, 2002

(65) Prior Publication Data

US 2002/0196841 A1 Dec. 26, 2002

Related U.S. Application Data

(63) Continuation of application No. PCT/FI00/01096, filed on Dec. 14, 2000.

(30) Foreign Application Priority Data

Dec. 15, 1999 (FI) .................................. 19992694

(51) Int. Cl.
*H04B 1/707* (2006.01)
*H04B 1/713* (2006.01)

(52) U.S. Cl. ...................... 375/147; 375/136; 375/149; 375/316; 370/342

(58) Field of Classification Search ................ 375/136, 375/316, 147, 174, 148, 143, 149, 343, 150, 375/142; 370/332, 335, 330, 342, 441
See application file for complete search history.

(56) References Cited

U.S. PATENT DOCUMENTS 5,218,619 A 6/1993 Dent
5,467,368 A 11/1995 Takeuchi et al.
5,579,304 A 11/1996 Sugimoto et al.
5,790,537 A * 8/1998 Yoon et al. .................. 370/342

(Continued)

FOREIGN PATENT DOCUMENTS

| EP | 823 796  | 2/1998  |
| EP | 849 886  | 6/1998  |
| EP | 949 766  | 10/1999 |
| SE | 9704026  | 1/1998  |

OTHER PUBLICATIONS

Yoon et al., "A Spread-Spectrum Multi-Access System with a Cascade of Co-Channel Interface Cancellers for Multipath Fading Channels," ISSSTA '92, Yokohama, Japan, Nov. 29-Dec. 2, 2002, pp. 87-90.

Haifeng et al., "New Approach of Multistage Multiuser Detector for Asynchronous CDMA Systems in Multipath Fading Channels," ICCT '98, Beijing, China, Oct. 22-24, 1998, pp. S42-06-01 to S42-06-5.

(Continued)

*Primary Examiner*—Stephen Chin
*Assistant Examiner*—Ted M. Wang
(74) *Attorney, Agent, or Firm*—Pillsbury Winthrop Shaw Pittman LLP

(57) ABSTRACT

A receiver for receiving a spread spectrum signal, comprising means for receiving a combination signal comprising a user signal spread with the user's spreading code, means for correlating the received combination signal for observing correlation between the user's spreading code and spreading codes used in the combination signal, means for regenerating the user signal by means of a user signal estimate and the user's spreading code, wherein the receiver comprises means for providing the user's spreading code synchronously to the means for correlating and the means for regenerating.

26 Claims, 9 Drawing Sheets

U.S. PATENT DOCUMENTS 5,917,829 A     6/1999   Hertz et al.
5,946,345 A     8/1999   Karlsson et al.
6,088,383 A     7/2000   Suzuki et al.
6,611,508 B1 *  8/2003   Abe ........................... 370/332
6,628,700 B1 *  9/2003   Miura ........................ 375/148

OTHER PUBLICATIONS

Khani et al., "A Comparison Study between different Slinding Window Decorrelating Detectors for Asynchronous CDMA-UMTS," ICPWC '2000, pp. 114-117.

* cited by examiner

METHOD OF RECEIVING SPREAD SPECTRUM SIGNAL, AND RECEIVER

This is a continuation application of International Application No. PCT/FI00/01096, which was filed on Dec. 14, 2000, which designated the U.S., and was filed in the English language.

FIELD OF THE INVENTION

The invention relates to a method and a receiver in a radio system employing the code division multiple access method.

BACKGROUND OF THE INVENTION

In a radio system using code division multiple access (CDMA), a plurality of transmitting and receiving stations are able to communicate in the same frequency band of the radio spectrum. A spreading code is reserved for each user for the duration of a connection, enabling the user to spread the information in a base-frequency signal. A receiver of the signal, in turn, is able to identify the information sent by the user by despreading it with a despreading code corresponding to the spreading code. Advantages of CDMA include efficient utilization of the frequency band, and system security. A disadvantage is that users interfere with each other's transmissions because of lack of orthogonality between spreading codes and lack of synchronization between transmitters. Interference, in turn, affects the utilization of the capacity of a radio system and the quality of connections.

Several methods exist for interference cancellation (IC) in CDMA systems. For example U.S. Pat. No. 5,579,304 discusses serial interference cancellation (SIC). In the solution presented in the publication, in each interference-cancelling stage, the signal of one or more users is removed in a receiver from a received combination signal of all signals. One or more strongest signals are removed from the received signal in each interference-cancelling stage. This allows a user of weaker signals to be identified in later interference-cancelling stages from a signal from which users that sent the strongest signals have been removed.

Interference cancellation methods based on multi-user detection (MUD) are effective. The idea in MUD-based interference cancellation methods is to utilize the information of several other users in the detection of each user signal. In the first stage, user signals are subjected to a detection stage by multiplying a combination signal by each user's spreading code to generate first symbol estimates. The symbol estimates are generated on the basis of symbols transmitted on a pilot channel or in bursts and known to the transmitter and receiver. After the detection stage, the user signals are subjected to one or more interference-cancelling stages, during which attempts are made to improve the symbol estimates of the user signals. In each interference-cancelling stage, the user signals are respread by regenerators or respreaders by means of symbol estimates, channel estimates and user spreading codes generated in a preceding detection stage or interference-cancelling stage. The regenerated user signals are combined to generate an interference signal. Parallel interference cancellation (PIC) methods generate an interference signal and utilize the generated interference signal in various ways depending on the method. In some solutions, the interference signal generated is subtracted from the combination signal, and the residual signal generated is used in the generation of user signal estimates specified in a detection step of the interference cancellation stage. The specified user signal estimates are generated by means of correlators that receive as input, in addition to a combination signal or a residual signal, a despreading code for each user. Code generators are used to generate both the spreading code for the regenerators and the despreading code for the correlators. Specified user signal symbol estimates and a residual signal, generated from the received combination signal by subtracting the regenerated user signals from it in the interference-cancelling stage, are thus obtained as output of each interference-cancelling stage.

Prior art solutions for multi-stage interference cancellation have a drawback. The necessary interference cancellation equipment, such as regenerators, code generators and correlators, has to be duplicated for each interference-cancelling stage. This increases significantly the costs of the interference cancellation equipment, and essentially increases the complexity of the equipment.

BRIEF DESCRIPTION OF THE INVENTION

The object of the invention is thus to provide an improved method and apparatus for interference cancellation in a receiver. This is achieved by a method of receiving a spread spectrum signal to be described next, the method comprising: receiving a combination signal comprising user signals spread with various spreading codes, generating samples from the received combination signal, and cancelling multi-user interference from the samples generated. The method comprises selecting a sample set including N successive samples, reading one or more samples from said sample set, generating sample estimates for the spread user signals corresponding to the sample by means of the user signal estimates and spreading codes, subtracting the generated sample estimates from the sample corresponding to them to generate a residual signal sample, using the residual signal sample in the generation of specified user signal estimates to be used in a following sample estimate generation stage, returning to the above-mentioned sample reading procedure until all samples in the sample set that are necessary for generating the user signal estimates are processed, generating final user signal estimates for M oldest samples in the sample set on the basis of the specified user signal estimates generated for them, removing M oldest samples from the sample set and returning to the sample set selection procedure by selecting M new samples to the sample set of N samples in addition to the N–M samples belonging to the previous interference-cancelling stage.

The invention also relates to a receiver for receiving a spread spectrum signal and comprising one or more antennas for receiving a combination signal, which comprises user signals spread with several spreading codes, a sampler for generating samples from the combination signal received, storing means for storing the generated samples in a sample memory comprised by the receiver, and an interference-cancelling unit for cancelling multi-user interference from the samples generated. The interference-cancelling unit comprised by the receiver comprises means for selecting a sample set including N successive samples, means for reading one or more samples from said sample set, one or more regenerators arranged to generate spread user signal sample estimates corresponding to the sample by means of the user signal estimates and spreading codes, one or more subtractors arranged to subtract from the sample corresponding sample estimates to generate a residual signal sample, one or more correlators arranged to use the residual signal sample in the generation of the specified user signal estimates for use in a following sample estimate generation stage, means for repeating the measures performed by the regenerator, subtractor and correlator on all samples in the sample set that are necessary for the generation of the user signal estimates, means for generating final user signal estimates for M oldest samples in the sample set on the basis of the specified user signal estimates generated for them, means for removing M oldest samples from the sample set and means for selecting M new samples to the sample set of N samples, means for repeating the measures performed by said means on a new sample set of N samples.

The preferred embodiments of the invention are disclosed in the dependent claims.

The object of the invention is thus to provide a method in which the same interference cancellation apparatus can be used in all interference-cancelling stages. The solution of the invention is preferably applied to receivers employing parallel interference cancellation. In a preferred embodiment, a detection stage, during which first symbol estimates are generated for the user signals, precedes one or more interference-cancelling stages to be performed. According to a second preferred embodiment, zeroes are used as user signal estimates for each user in a first interference-cancelling stage, the first symbol estimates not being generated until in the first interference-cancelling stage.

In the method of the invention, a broadband combination signal is received, converted into digital and samples are generated from the signal. The samples are stored in a sample memory, which in an embodiment is of the ring buffer type. According to a preferred embodiment, M samples of each interference-cancelling stage that have resided in the memory longest are deleted from the sample memory and replaced with M new samples. The M samples are preferably a signal sample set allowing at least one new symbol to be detected for each user after the M new samples are read. The M samples are herein preferably a multiple of each user's symbol length.

A sample set including N samples is read from the sample memory to one interference-cancelling stage. The samples are processed one at a time or a sample set of several samples at a time. In this context, processing means steps included in one interference-cancelling stage, such as: correlation of new symbol estimates on the basis of the samples; regeneration of sample estimates on the basis of user signal estimates generated; generation of a residual signal sample by subtracting the sample estimate from the sample. N is preferably a multiple of M and at least two times M. Herein, when N is at least two times M, each interference-cancelling stage obtains from each user a number of samples that enable the detection of at least one new symbol from each user.

According to a preferred embodiment of the invention, user signal estimates are stored in a correlation memory, previous estimates of each interference-cancelling stage being replaced by specified estimates. After a given sample set of M samples has been subjected to interference-cancelling stages, symbol estimates corresponding to said M samples are read from the correlation memory, these being the users' final symbol estimates that can be transferred to hardware parts performing deinterleaving.

In the receiver, the regenerators may need symbol estimates from the correlation memory. Correlators, in turn, obtain from the sample memory the combination signal or residual signal required in the correlation. According to an embodiment of the method of the invention, the correlation memory and sample memory are mutually synchronized so as to allow symbol estimates corresponding to a given sample set M to be localized in the correlation memory. Memory synchronization is utilized in the invention such that symbol estimates corresponding to a given sample set M to be directed to the correlators are directed to the regenerators simultaneously. This allows the code generators to generate the spreading code and the despreading code simultaneously for a given user.

In a preferred embodiment, the solution of the invention is such that the correlators correlate, or despread user signal estimates a given number of samples before the regenerators. Herein, the first regeneration, or spreading stage uses actual symbol estimates generated from user signals. The invention is not limited to how much before the regenerators the correlators process the samples. In a preferred embodiment, the correlators process the samples M samples before the regenerators, wherein M samples is a sample set so long that it comprises one sample from each user. According to a second preferred embodiment, the correlators and regenerators process the samples simultaneously, whereby zeroes are used as user signal estimates in the first regeneration stage.

The method and apparatus according to the invention are preferably implemented in a base station or similar receiver unit of a radio network employing the code division multiple access method, in which the spreading codes of all users within the coverage area of a receiver unit are known.

The invention provides the significant advantage that if the processing of signal samples is timed according to the method of the invention, only one interference cancellation unit is required, which performs one or more interference-cancelling stages. This provides significant savings in costs, since the apparatus does not have to be duplicated for each interference-cancelling stage.

BRIEF DESCRIPTION OF THE FIGURES

In the following the invention will be described in greater detail by means of preferred embodiments with reference to the attached drawings, in which.

DETAILED DESCRIPTION OF THE INVENTION

Figure 1:
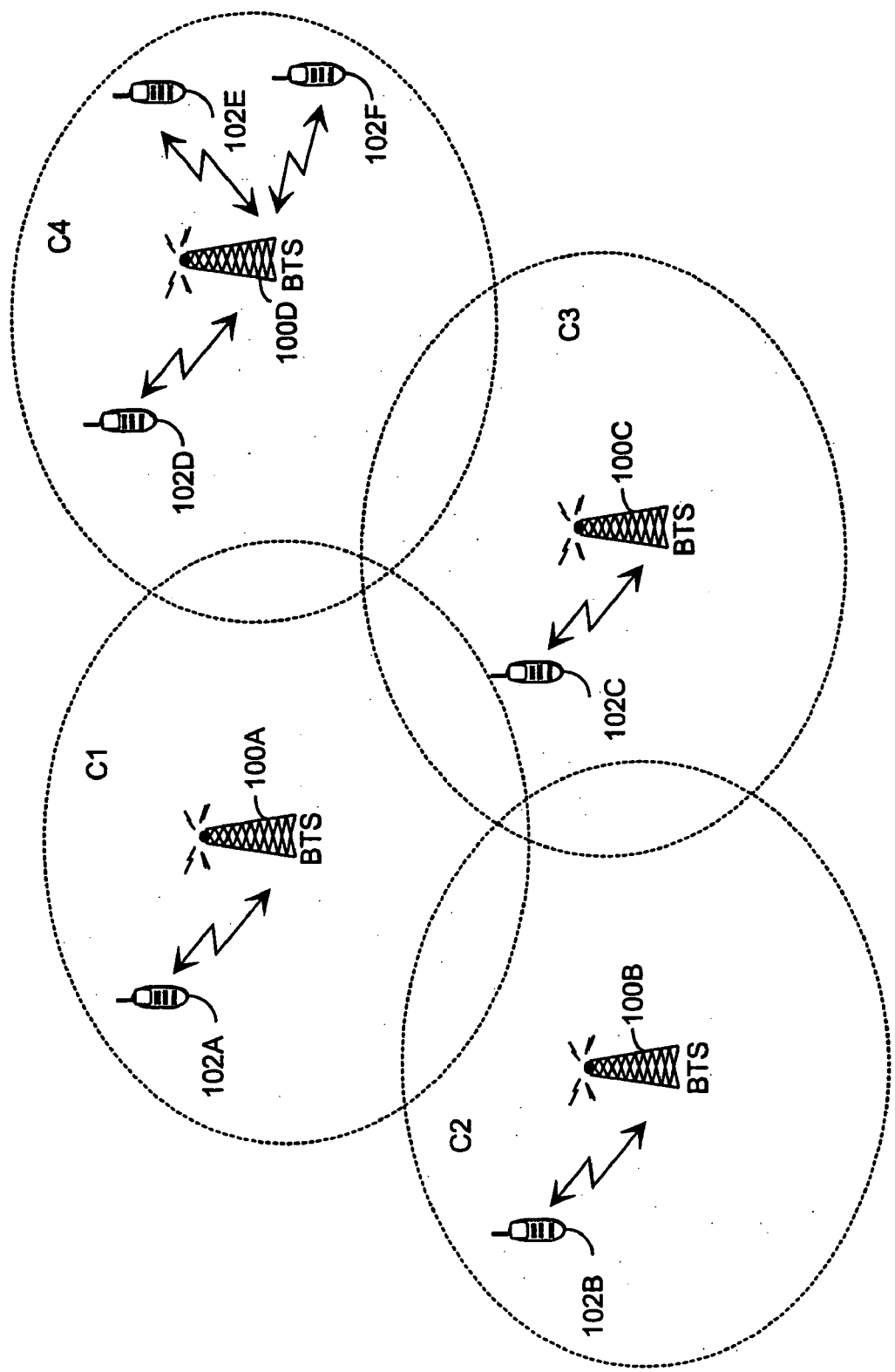
FIG. 1 shows a mobile network.

In the following, the invention will be described with reference to the attached FIGS. 1 to 9. FIG. 1 schematically shows a mobile system comprising base stations 100A to 100D. The coverage area of a base station is called a cell, denoted with C1 to C4 in the figure, corresponding to the base stations 100A to 100D. The cells may overlap, as is shown in the figure; for example cell C2 partly overlaps cells C1 and C3. One or more mobile stations 102A to 102F are shown in the figure in the area of each cell C1 to C4. The mobile stations are for example mobile telephones, but may also be other apparatuses, such as computers, domestic appliances or other corresponding devices provided with radio receiver and/or transmitter properties. In a radio network employing the code division multiple access method, such as a mobile network, all users use the same frequency band simultaneously. In several practical applications, the same frequency band is also used in adjacent cells, such as in the cells C1 to C4 shown in FIG. 1.

The information to be transmitted to a radio channel is multiplied by a spreading code, whereby the relatively narrow-band information is spread to a broad frequency band. Each connection has a specific spreading code or spreading codes, which the receiver uses to identify the transmissions intended for it. The aim is to select mutually orthogonal user spreading codes, whereby they do not correlate. In practice, spreading codes are not mutually completely orthogonal, wherefore users interfere with each other. In FIG. 1, receivers 102D to 102F in cell C4 interfere with each other, and, in addition, experience interference from terminals 102A to 102C located in the areas of the other cells C1 to C3. Interference between terminals 102A to 102F is also caused by the signal transmitted by each terminal propagating along several different paths to the receiver. This multipath propagation causes a user signal to reach the receiver in several components at different delays causing interference to other users.

Typically, a maximum number of 256 different orthogonal spreading codes can be used simultaneously. For example in UMTS (Universal Mobile Telephony System) downlink, when a 5-MHz carrier is used at a chip frequency of 3.84 Mcps, spreading factor 256 corresponds to a transfer rate of 30 kbps; similarly, the highest practical transfer rate is achieved with spreading factor 4, data transfer rate being 1,920 kbps. The transfer rate in a channel thus varies step by step, for example 30, 60, 120, 240, 480, 960 and 1,920 kbps, the spreading factor varying similarly: 256, 128, 64, 32, 16, 8 and 4. The data transfer rate available to a user also depends on the channel coding used. For example, when ⅓ convolution coding is used, the user data transfer rate is about ⅓ of the data transfer rate of the channel. The spreading factor indicates the length of the spreading code. For example, the spreading code corresponding to spreading factor one is (1). Spreading factor two has two mutually orthogonal spreading codes (1,1) and (1,−1). Further, spreading factor four has four mutually orthogonal spreading codes: under an upper level spreading code (1,1) are spreading codes (1,1,1,1) and (1,1,−1,−1), and under a second upper level spreading code (1,−1) are spreading codes (1,−1,1,−1) and (1,−1,−1,1). The generation of spreading codes continues this way when moving to lower levels in the code tree. The spreading codes of a particular level are always mutually orthogonal. Similarly, on the following levels the spreading code of a particular level is orthogonal to all spreading codes derived from another spreading code at the same level. In transmission, one symbol is multiplied by a spreading code, the data being spread to the frequency band used. For example, when spreading code 256 is used, 256 chips express one symbol. Similarly, when spreading code 16 is used, 16 chips express one symbol.

Information transfer between base stations 100A to 100D and terminals 102A to 102F takes place on radio channels. Uplink refers to information from a terminal to a base station, whereas downlink refers to transmission from a base station to a terminal. In CDMA, uplink and downlink can be separated for example by means of frequency division duplex (FDD), whereby uplink and downlink are in different frequency ranges or by means of time division duplex (TDD), whereby transport directions are separated from one another in time. In the UMTS FDD mode, for example the following transport channels can be placed on physical channels: DCH is used to transfer both uplink and downlink user and control information between base stations 100A to 100D and terminals 102A and 102F. A broadcast channel (BCH) is used for downlink transfer of information to terminals from a cell, and a paging channel (PCH) is used to request for location data from a terminal in cases when the system is unaware of the location of the terminal. A forward access channel (FACH) is used for transmitting information to a terminal in cases when the base station is aware of the location of the terminal, and a terminal can use a random access channel (RACH) to transfer uplink control information associated with for example connection set-up, and the system can use a synchronization channel (SCH) to transfer synchronization information to terminals. Some radio channels were presented above by way of example, and the presentation of all of them is not relevant to the invention. Transmission on radio channels takes place in fixed-form frame structures, which contain for example pilot symbols, user data and control information. Pilot symbols are a group of symbols known to both terminals 102A to 102F and base stations 100A to 100D. The party receiving a signal uses pilot symbols to generate the channel impulse response to establish the strengths and delays of multipath propagated components. The impulse response is used in a receiver, for example in a RAKE type of receiver, to allocate a finger branch to the best signal components. The channel estimate information so obtained from the pilot symbols is utilized in a receiver for interference cancellation, which serves to cancel interference from received user signals, allowing the information transmitted by a transmitter to be received as errorless as possible.

Several methods exist for cancellation of interference caused by users to each other. In practice, the methods are applied in base stations, which are aware of all users and the spreading codes used by them, and are thus able to cancel the interference caused by other users to a given user. Interference cancellation methods can be coarsely divided into single-user detection methods and multi-user detection (MUD) methods. In single-user detection methods, the desired user signal is correlated from the received combination signal by using for example adaptive filtering, whereby attempts are made to arrange filter coefficients orthogonal against interference caused by other user signals at each particular time. User signal detection does not utilize other users' signals. User detection in multi-user detection methods utilizes the information obtained from other user signals to improve the identification of the detecting user.

Figure 2:
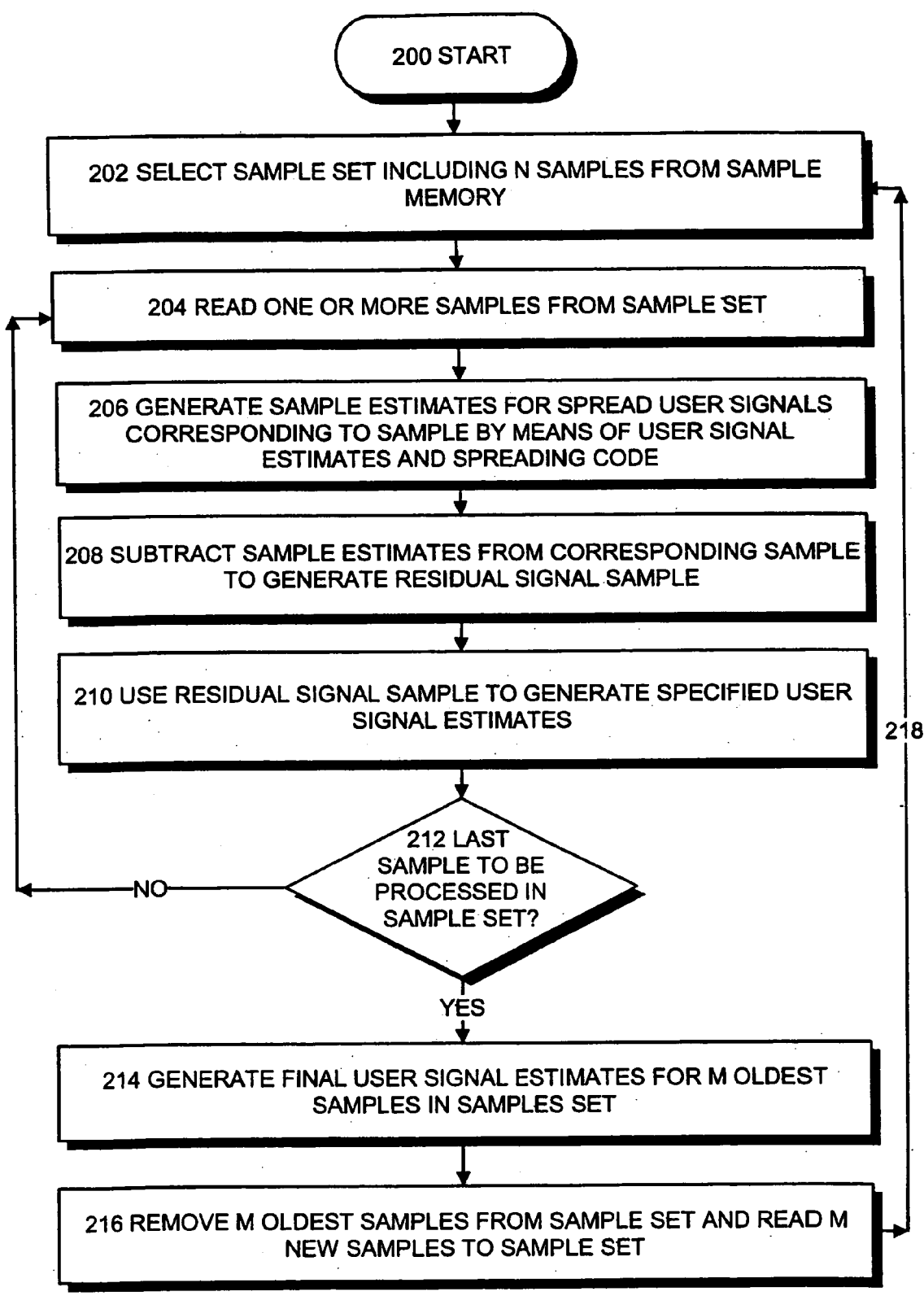
FIG. 2 is a method diagram of an embodiment of the method of the invention.

FIG. 2 shows a preferred embodiment of the method of the invention. In the initial method step 200, a radio network employing the code division multiple access method, such as a mobile telephone network, comprises a plurality of transmitters, such as mobile stations, which transmit information simultaneously in the same frequency band. The information transmitted by the mobile stations is composed of symbols, for example bits, spread to a broad frequency band by multiplying user bits by a spreading code allocated to the user from the network for the connection. The information transmitted by the mobile stations is received in a CDMA receiver as a combination signal comprising one or more multipath propagated components of all users using the network at that particular moment. The receiver is preferably a RAKE type of receiver located in a base station and receives from each user optionally several multipath propagated components that are combined in the receiver to obtain the best possible identification.

A broadband analog signal is first converted into digital form and a first user signal detection stage is preferably performed, allowing first symbol estimates to be generated from the symbols transmitted in the user signal. In the detection stage, the broadband signal is multiplied by a user despreading code, which is equal to the spreading code if the spreading code was real. If the spreading code was a complex number, the despreading code is a complex conjugate of the spreading code. In practical application, the detection stage is succeeded by one or more interference-cancelling stages for cancelling the interference caused by other users from the user signal. A preferred embodiment includes no separate detection stage, whereby zeroes are used as first user signal estimates.

In method step 202, samples are generated from the combination signal stored in digital form and the samples are stored in a sample memory. A sample set including N samples is selected for processing. The set of N samples further includes at least two sample blocks of M samples. N is preferably a multiple of M. If N is for example 150, M could be 50 samples, for example. Since user symbols may be of different lengths and at different phases, the sample set of M samples is preferably selected by taking into account symbol boundaries such that the sample set of M samples is such that taking new M samples to the sample set of N samples yields at least one new symbol from each user to interference cancellation. Referring to the above example, if the highest user spreading factor is 50, a sample set of 150 samples includes at least two full symbols from each user. If the boundaries of a sample set do not exactly match user symbol boundaries, each end of the sample set comprises for a user one partial symbol that cannot fully be correlated from the samples of the sample set.

In steps 204 to 212, at least part of the samples of the sample set are processed one sample at a time, preferably starting with the oldest sample in the sample set. In step 204, the reception time is used to read the following sample of the sample set from the sample memory. In step 206, at least part of the spread user signals are regenerated by means of user signal estimates and user spreading codes. A user signal estimate comprises both a symbol estimate and a channel estimate. The channel estimate is generated for example by receiving known symbols transmitted on a mobile system pilot channel or in a pilot sequence on a data channel and by comparing the correlated correlation values with known symbol values. This enables the estimation of signal amplitude and phase for each received multipath component of a signal for coherent detection and user signal regeneration. The same spreading code with which the transmitter, such as a mobile telephone, transmitted the original data is used as the spreading code in user signal regeneration. A new spread user signal is thus generated for each user, and the user signals are used to cancel multi-user interference depending on the parallel interference cancellation method used. In step 206, this is carried out one sample at a time by generating for each user signal a sample estimate corresponding to that sample of the sample set which is to be processed.

In a preferred embodiment, all sample estimates generated for user signals are summed up and subtracted from a sample of the sample set read to the interference-cancelling stage. This procedure is analogous to that described in method step 208, in which a sample estimate generated from each user signal is subtracted from a sample of the sample set, whereby the sample is cleaned to a degree corresponding to the interference included in the sample estimates.

A residual signal sample is obtained as the difference between the sample of the sample set and the sample estimates of all users, and is used in the generation of new user signal estimates in step 210. In a preferred embodiment, the sample of the sample set to be processed is replaced with the residual signal sample by storing the residual signal sample in the sample memory. Hereby, in addition to specified user signal estimates, the residual signal is also obtained as an output of the interference-cancelling stage. According to a second preferred embodiment, the residual signal sample is not stored in the sample memory, but the residual signal sample is used only in method step 210 in the generation of new user signal estimates.

In method step 210, user signals are correlated one sample at a time either directly from residual signal samples or for example from the sum of the residual signal samples and the sample estimates of the user signal to be correlated at each particular time. In correlating a user signal from residual signal samples, residual correlations are obtained, which can be used to specify the user signal estimates used in step 206.

Method step 212 describes how steps 206 to 210 are repeated for each N samples of the sample set, and the process continues in step 214 after the last sample of the sample set to be processed has been processed. All samples of the sample set do not necessarily have to be processed, but processing may be stopped for example at the last detected user signal symbol boundary, as will be described later for FIG. 4. Similarly, in step 204, processing may start, not only at the last sample, but also for example at the first detected user signal symbol boundary.

In method step 214, final user signal estimates are generated for the last sample block of M samples of the sample set on the basis of the specified user signal estimates generated in step 210 for this sample block.

In method step 216, M oldest samples are removed from the sample set, M new samples are read to the sample set from the sample memory, and a new sample set N is thus generated, wherein the samples are in the order they were received. Step 218 describes that interference cancellation is repeated in the same way for the next sample set N. Each sample group M will thus be processed N/M times before it is removed from the sample set.

Figure 3:
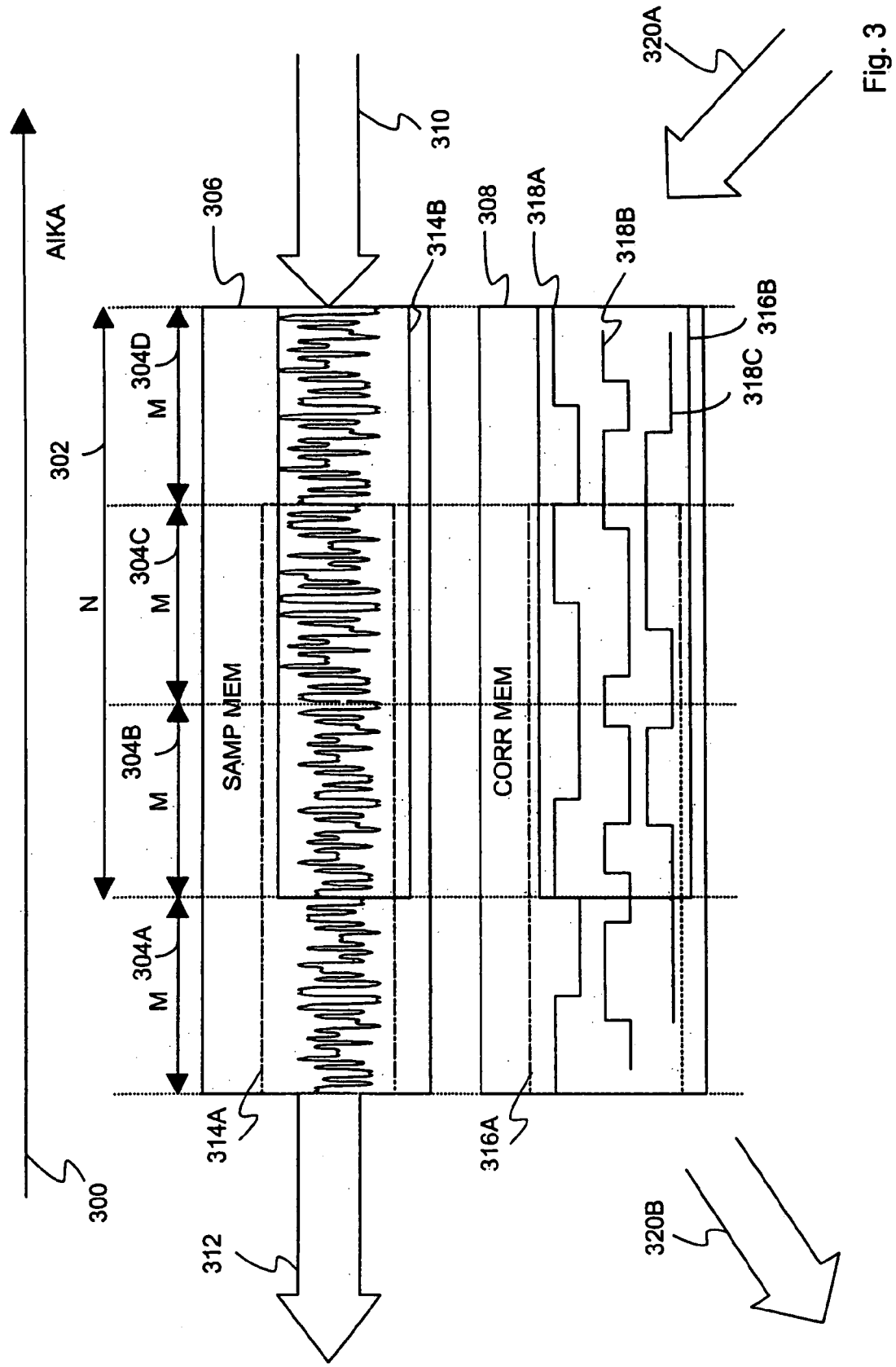
FIG. 3 shows the memory structure of the receiver of the invention.

Referring to FIG. 3, an embodiment of the method of the invention will be described next. FIG. 3 shows a combination signal 310 reception time 300. The reception time increases to the right, i.e. the samples generated from the combination signal 310 are newer, i.e. later received, to the right in the combination signal 310. The samples generated from the combination signal 310 are stored in a sample memory 306. A sample set 314A to 314B of the length of N 302 samples is always read from the sample memory 306 to one interference-cancelling stage. One sample set of the length of N samples preferably includes a multiple of sample groups of the length of M samples. A dashed line 314A in the figure denotes a sample set of N samples to be read to one interference cancellation state, for example stage i, and a solid line 314B denotes a sample set of N samples to be read to the next interference-cancelling stage i+1. The figure shows that the sample set to be processed in the interference-cancelling stages is shifted to the right always M samples at a time. Sample set 314A includes sample groups 304A, 304B and 304C, whereas in sample set 314B, the sample set is shifted M samples to the right, the sample set comprising sample groups 304B, 304C and 304D. In a preferred embodiment, the user signal estimates are stored in a correlation memory 308, in which the best estimates of received symbols and the calculated channel estimates for each user signal 318A, 318B or 318C at each particular time are stored. Sample set 316A or 316B is read from the correlation memory 308 to the user signal spreading stage, and, similarly, sample set 314A or 314B is read from the sample memory to the user signal correlation stage. The sample memory 306 and the correlation memory 308 are preferably mutually synchronized so that the information necessary for the spreading and correlation stages is read from the memories simultaneously. Hereby, for example sample set 314A is read from the memory and directed to the correlation stage at the same time as sample set 316A is read and directed to the spreading stage. As starting values 320A for the user symbol estimates in the correlation memory 308 are preferably used symbol estimates correlated from the combination signal in a detection stage optionally preceding the interference-cancelling stages or, in the absence thereof, zeroes. In the correlation memory 308, after each user signal correlation stage and symbol estimate generation stage, the previous symbol estimates are replaced with the specified values. After the interference-cancelling stages performed, final user signal estimate values 320B are obtained from the symbol estimates and they can be transferred to other routines of the receiver, such as deinterleaving to interpret information received.

Figure 4:
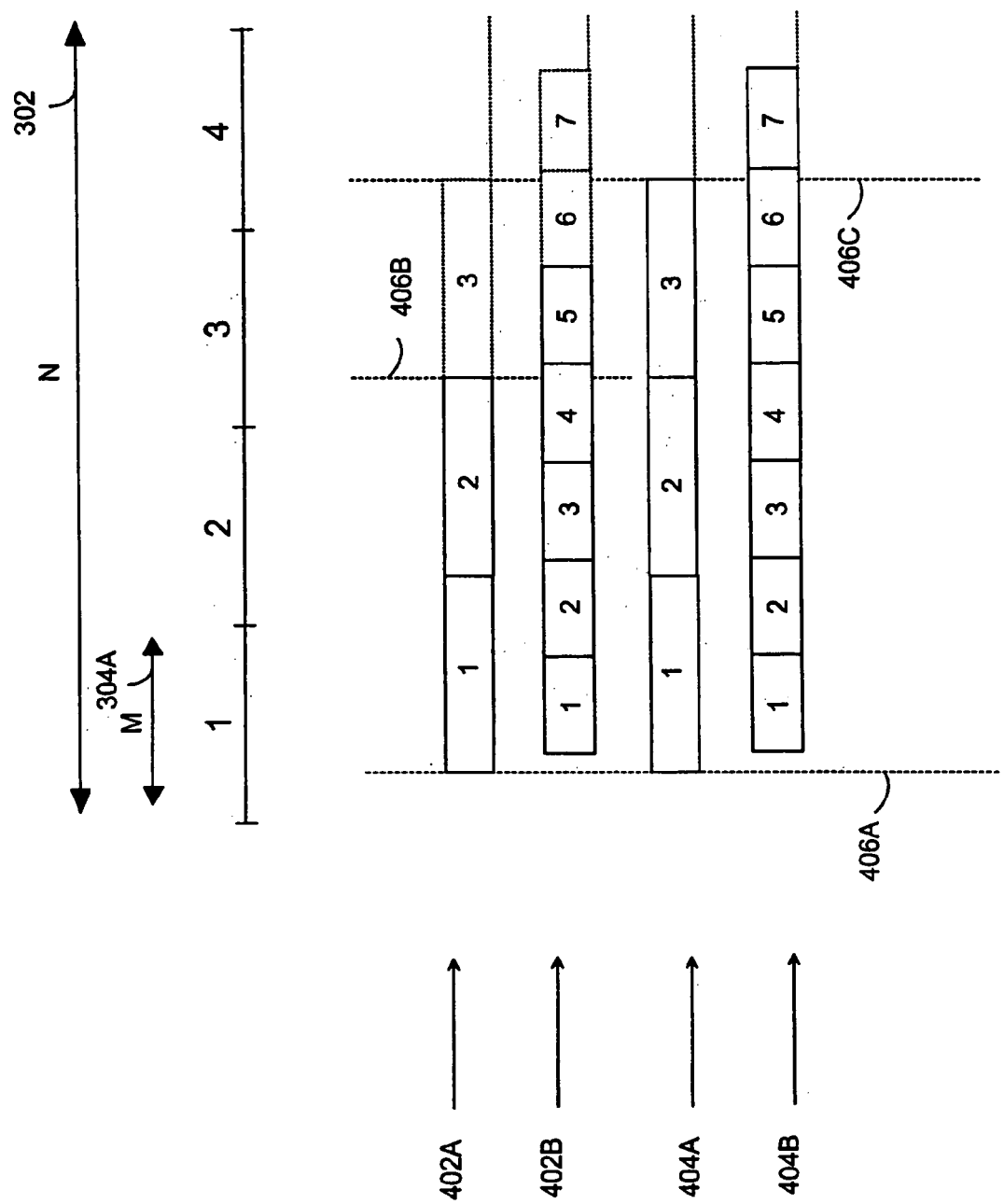
FIG. 4 illustrates identification of symbol limits.

FIG. 4 shows symbol boundary detection in a method according to the invention. Topmost in the figure, four sample groups 304A of the length of M samples are shown and numbered from 1 to 4. The sample groups 1 to 4 together form a sample set 302 of the length of N samples. The length of block M is selected to be a multiple of the symbol length of all user signals, i.e. in FIG. 4, the length of block M is described to be exactly of the length of one symbol of user 1 and exactly of the length of two symbols of user 2. The figure shows symbols 402A to be read to user 1 regeneration and symbols 402B to be read for user 2 regeneration. Symbols 404A to be generated in user 1 correlation stage and symbols 404B to be generated in user 2 correlation stage are shown lowermost in FIG. 4.

FIG. 4 shows two preferred embodiments of the timing according to the invention. According to the first embodiment, no detection stage precedes the interference-cancelling stages, which means for user 1, for example, that samples corresponding to symbols 1 to 3 are read to the correlation stage 404A, but only symbols 1 and 2, denoted by solid lines, are read to the regeneration stage 402A. During the correlation of symbol 3, the regenerators are free and do not process any samples. According to a preferred embodiment of the invention, in the interference-cancelling stage of a signal of user 1, for example, user 1 regeneration is either switched off between symbol boundaries 406B and 406C, and methods steps 206 to 208 of FIG. 2 are not carried out, or zeroes are used as user signal estimates for the generation of sample estimates, whereby method steps 206 to 208 have no effect, the residual signal samples obtained as their output for method step 210 being the same as the combination signal samples read from the sample memory.

According to a second preferred embodiment, the interference-cancelling stages are preceded by a detection stage for generating preliminary user signal estimates. In FIG. 4 this can be seen such that for example for user 1, samples corresponding to symbols 1 to 3 are read to the correlation stage 404A, these samples also participating in the regeneration for symbol 3, denoted by a dashed line.

Partial symbols may remain at the beginning and end of a sample set, which in some embodiments can also be utilized by subjecting them to interference cancellation or correlation. However, this is not shown in FIG. 4. If the partial symbols are not used, in an embodiment, part of the samples in a sample set may also be left out from the processing for example by starting the processing from the first detected user signal symbol boundary and continue from there to the last detected symbol boundary.

Figure 5:
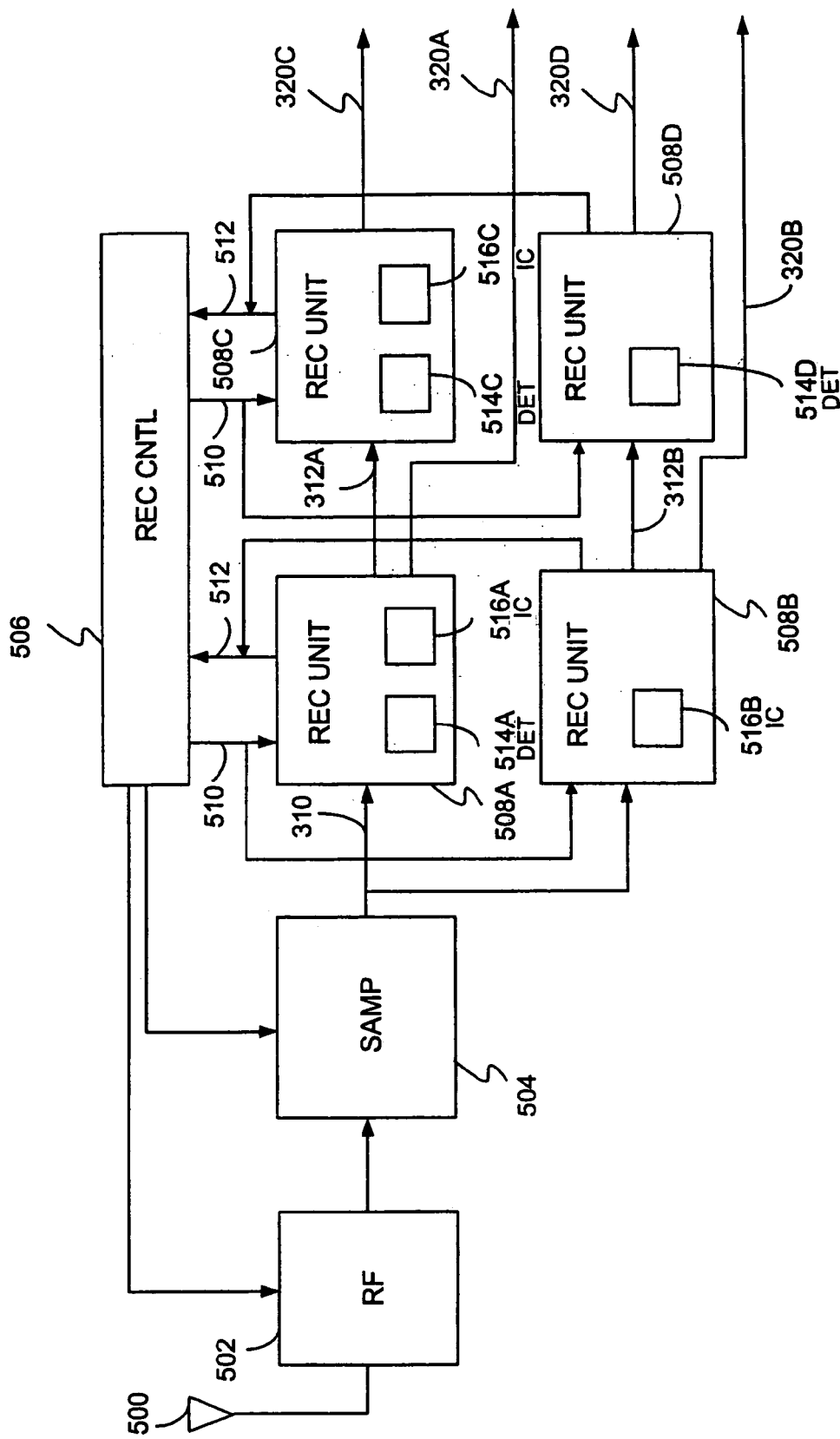
FIG. 5 shows an embodiment of the receiver of the invention.

FIG. 5 is a block diagram of the structure of the receiver of the invention. The receiver comprises one or more antennas 500 for receiving a broadband combination signal. From the antenna 500, the signal is input to radio frequency parts 502, where the radio-frequency signal is processed before a sampler 504. Sampling 504 involves conversion of the received signal from analog into digital form and taking samples from the digital signal. After the sampling 504, the combination signal 310 is input to one or more first stage receiver units 508A and 508B. The operation of the radio frequency parts 502, the sampling 504 and the receiver units 508A to 508D is controlled by reception control 506. Control information 510 to be transmitted to the receiver units 508A to 508D is for example timing information, information on the spreading codes used and on channel estimates. The receiver units 508A to 508D, in turn, return channel measurement data and data on the signal-to-interference ratio (SIR) to the control unit 506. Of the receiver units shown in FIG. 5, 508A to 508B receive the combination signal 310, and, having removed a given user group, the effect of one or more users on the combination signal, transmit residual signals 312A to 312B to the next receiver units 508C to 508D. The receiver units 508C and 508D, in turn, remove the effect of another user group on the combination signal 310. As output from each receiver unit 508A to 508D is obtained user signal estimates 320A to 320D. The structures of the receiver units 508A to 508D shown in FIG. 5 are different. Receiver unit 508A comprises a separate detection unit 514A for generating preliminary user signal estimates. The user signal estimates are processed in an interference cancellation unit 516A comprised by receiver unit 508A in one or more interference-cancelling stages. Receiver unit 508B comprises an interference cancellation unit 516B, but no separate detection unit. Receiver unit 508D, in turn, only comprises a detection unit 514D without any interference cancellation unit. The structure of receiver unit 508C is similar to that of receiver unit 508A.

Figure 6:
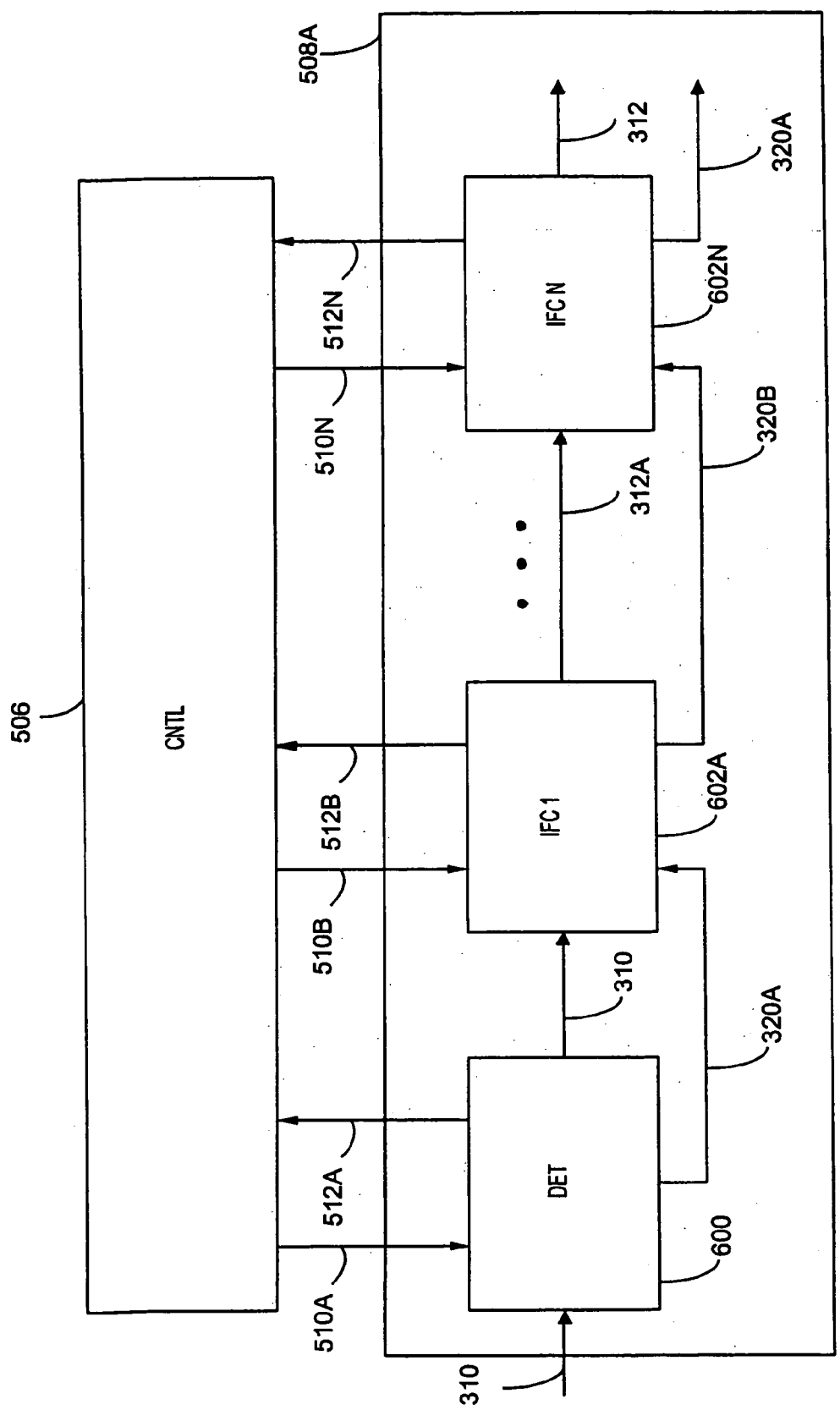
FIG. 6 shows an embodiment of an interference cancellation unit of the invention.

FIG. 6 is a method diagram of the operation of the receiver unit 508A shown in FIG. 5. Reception control 506 transmits control data 510A, such as information on spreading codes used, channel estimation data and delay data to a detection stage 600 and to one or more interference-cancelling stages 602A to 602N. The detection stage 600 is preferably carried out in the detection unit 514A of the receiver unit 508A shown in FIG. 5, and the interference-cancelling stages 602A to 602N are preferably carried out in the interference cancellation unit 516A of the receiver unit 508A. As its input, the detection stage 600 obtains the combination signal 310, and generates first symbol estimates from user signals and sends them to the interference-cancelling stage 602A. The first interference-cancelling stage 602A returns as its output the residual signal 312A and specified user signal symbol estimates, which are transferred to the next interference-cancelling stage. The last interference-cancelling stage 602N returns as its output final user signal estimates 320A for given users. The residual signal 312 is directed to the next receiver units shown in FIG. 5, for example to 508C.

Figure 7:
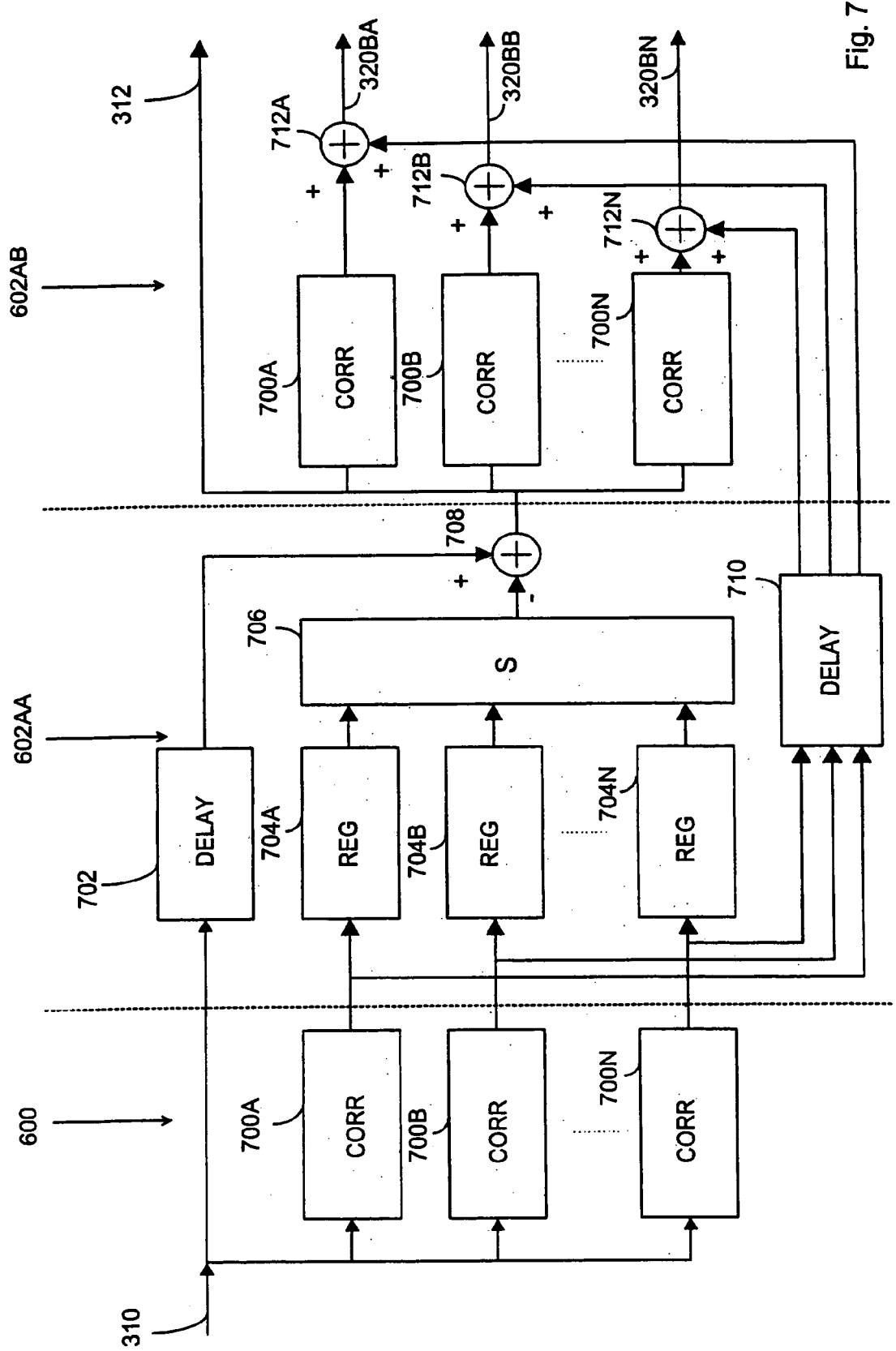
FIG. 7 shows an embodiment of the receiver of the invention using parallel interference cancellation.
Figure 8:
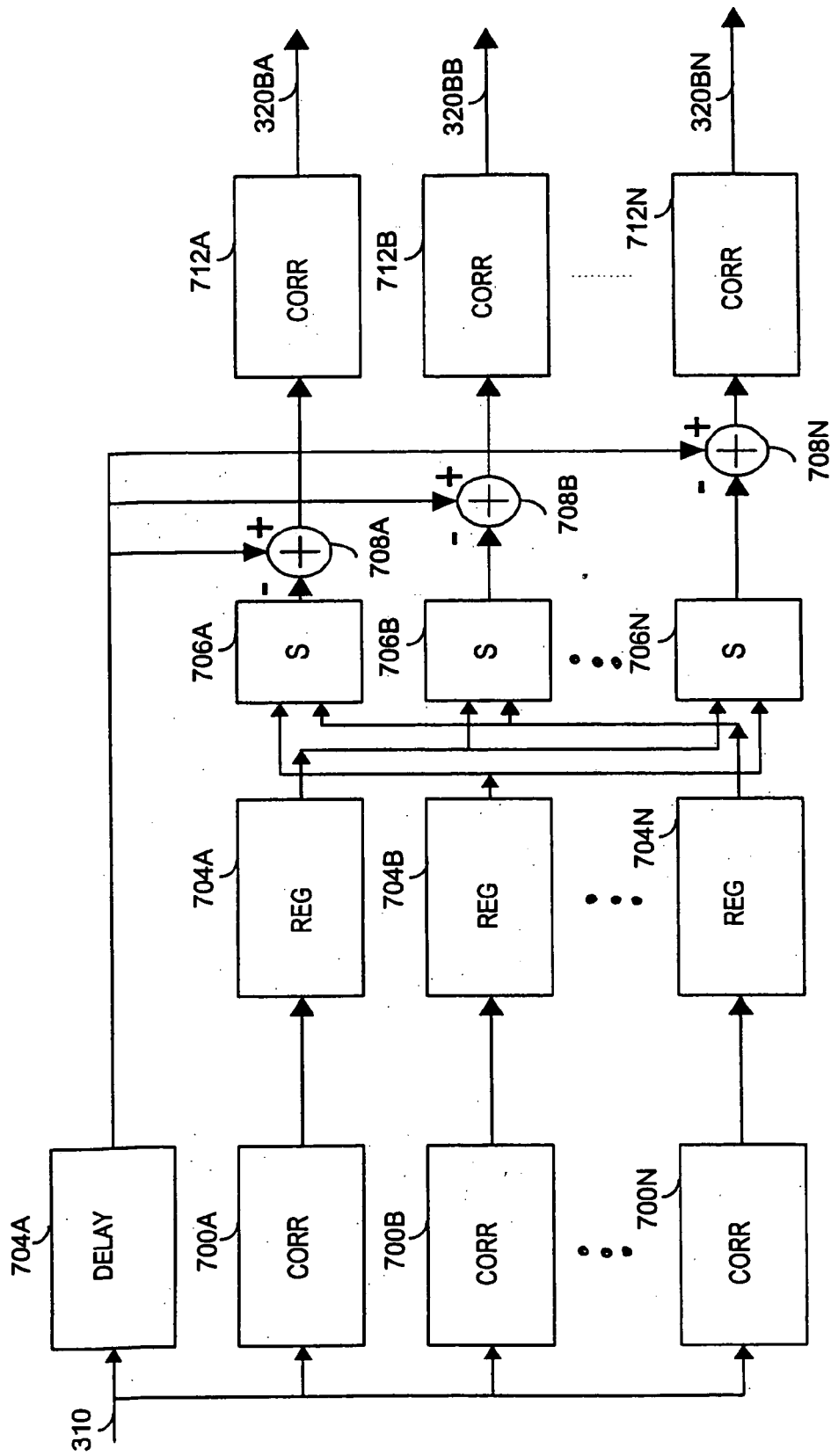
FIG. 8 shows an embodiment of the receiver of the invention using parallel interference cancellation.

FIGS. 7 and 8 show two different methods of parallel interference cancellation. A receiver receives a broadband combination signal 310 in a first detection stage 600. The signal is directed to correlators 700A to 700N, which correlate user signals by means of a spreading code. Correlator 700A may correlate for example user 1 signal using user 1 despreading code, and correlator 700B user 2 signal using its despreading code. Correlators 700A and 700B may also both correlate multipath propagated components of user 1 signal. In the first detection stage 600, the combination signal is used to generate for each user first symbol estimates, which are directed to signal regenerators 704A to 704N of the first interference-cancelling stage 602AA. In regenerators 704A to 704N, user signals are spread by means of users' spreading codes and user signal estimates. Signal regenerator 704A, for example, is used to spread the first user's signal by means of its spreading code and the symbol estimates generated in detection stage 600. In the receiver of FIG. 7, employing parallel interference cancellation, the spread user signals are combined in an adder 706 to an interference signal. The interference signal is directed to a subtractor 708, where the interference signal is subtracted from the combination signal 310 delayed by a delay unit 702. As subtractor 708 output is obtained a residual signal, which is directed to the next detection stage 602AB and to correlation to be performed therein with correlators 700A to 700N. By the addition of the residual correlation values generated in the correlation of the residual signals to the correlation values of the first detection stage 600, specified correlation values are obtained that are used in the generation of specified user signal estimates.

Figure 9:
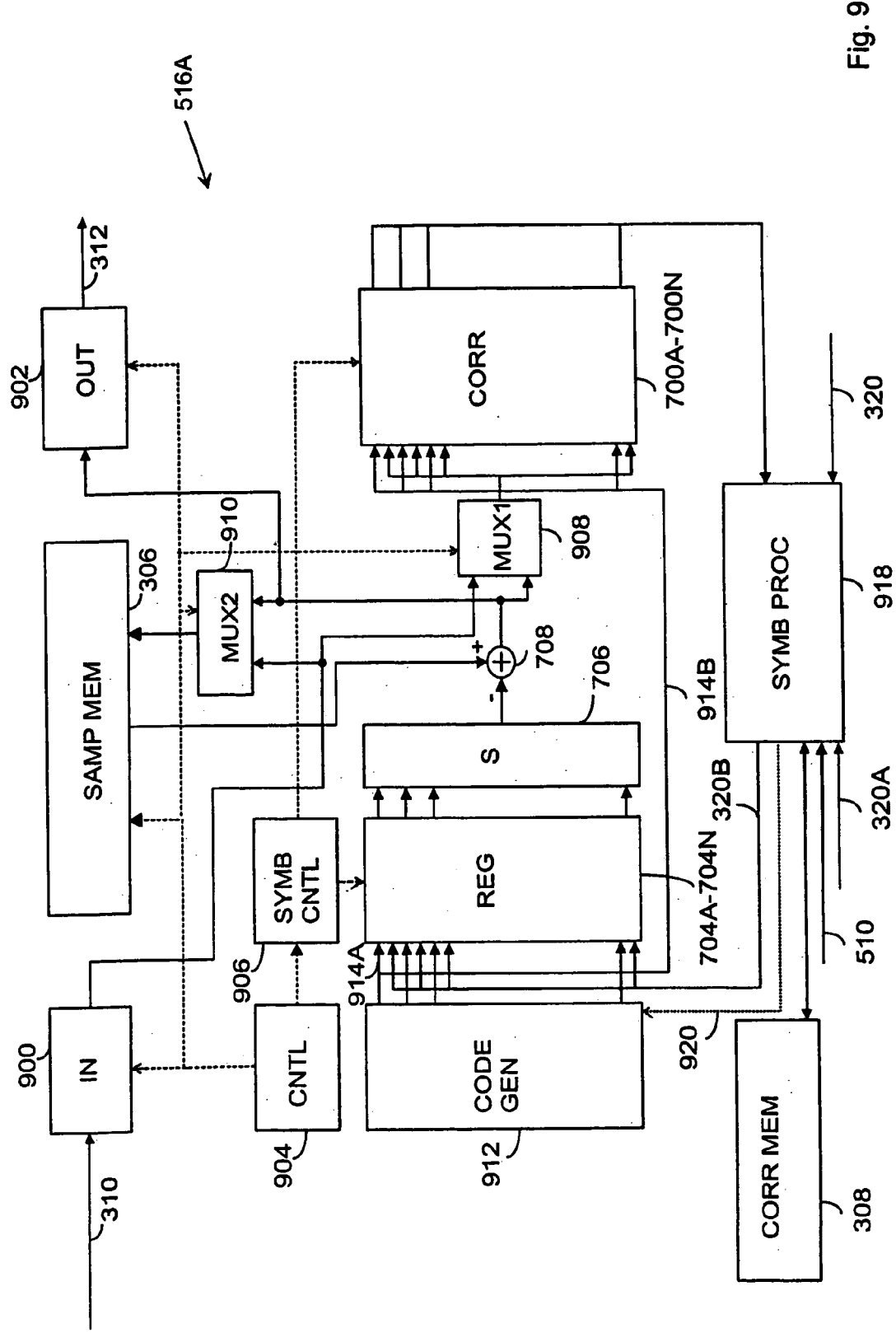
FIG. 9 shows an embodiment of the interference cancellation unit of the receiver of the invention.

Accordingly, interference-cancelling stages 602A to 602N following the first detection stage 600 can be thought to be divided into an interference-cancelling stage, e.g. 602AA, and a detection stage 602AB. A solution according to the invention, described also in FIG. 9, shows that correlators 700A to 700N used in the first detection stage are the same correlators as are also used in the second detection stage 602AB and the following detection stages. This also applies to user signal regenerators 704A to 704N of interference-cancelling stage 602A, the same regenerators 704A to 704N being also used in the following user signal spreading stages. In prior art solutions, regenerators 704A to 704N and correlators 700A to 700N would have to be duplicated in two successive interference-cancelling stages 602A and 602B.

FIG. 8 shows a second solution for implementing parallel interference cancellation. As distinct from the parallel interference cancellation apparatus shown in FIG. 7, the spread user signals obtained as output from regenerators 704A to 704N are combined in adders 706A to 706N in such a way that user signals spread in regenerators 704B to 704N are combined in adder 706A, and user signals spread in regenerators 704A and 704C to 704N are combined in adder 706B. This way the signal of user 1, spread in regenerator 704A, is cleaner when exiting subtractor 708A since the interference caused by other users to user 1 is cancelled from the signal. The cleaned user 1 signal is input to the detection stage of the first interference-cancelling stage to correlator 712A. FIG. 8 shows prior art solutions for this, wherein correlators 712A to 712N are separate physical devices than correlators 700A to 700N.

The apparatus according to the interference cancellation unit 516A of the receiver of the invention will next be described by means of a preferred embodiment with reference to FIG. 9. A sampled, broadband, digital combination signal 310 is received at an input buffer 900. The buffer 900 serves to receive the combination signal and apply the signal to interference cancellation at a rate permitted by processing. Signal samples are stored via a multiplexer 910 in a sample memory 306, which is a shift register or ring buffer type of memory area. After an interference-cancelling stage, the oldest sample set of M samples is always replaced in the sample memory 306 with M samples to be read from the input buffer 900. A controller 904 controls the operation of the sample memory, i.e. the controller comprises e.g. storing means for storing samples in the memory, reading means for reading samples from the memory and means for deleting samples from the sample memory. The receiver further comprises a symbol boundary management unit 906, which monitors, as shown in FIG. 4, the identification of symbol boundaries in correlators 700A to 700N and in regenerators 704A to 704N. The controller 904 also controls the symbol boundary management unit 906, and it also controls the operation of the input buffer 900. The basics of the parallel interference cancellation apparatus shown in FIG. 9 are similar to those shown in FIG. 7. FIG. 9 further shows a correlation memory 308, in which the last user symbol estimates are stored. From the correlation memory 308, the symbol estimates are read to the user signal spreading stage via a symbol processor 918, i.e. the user signal estimates 320B are used as input to regenerators 704A to 704N. The symbol processor 918 also carries out other tasks, such as addition of residual correlations to user signal estimates given to the regeneration stage, combination of multipath components, making symbol decisions, channel estimation and code generator control 920. The symbol processor 918 also preferably coordinates the interference cancellation and comprises e.g. repeating means for repeating the interference-cancelling stages. As input to the symbol processor 918 are obtained preliminary symbol estimates 320A, which are generated in a detection stage preceding the interference-cancelling stages or which are zero. As output from the symbol processor are obtained final symbol estimates 320, which are generated by means, comprised by the symbol processor, for generating user signal estimates. The apparatus of FIG. 9 is used to implement the method of the invention shown in FIG. 2, whereby the phases of regenerators 704A to 704N and correlators 700A to 700N are mutually so synchronized that the same sample set of M samples is processed therein simultaneously. In this case the code generators 912 are also mutually so synchronized that they are able to generate a spreading code 914A or a corresponding despreading code 914B simultaneously for regenerators 704A to 704N and correlators 700A to 700N. After the interference-cancelling stages performed for each sample set, the residual signal remaining from the interference-cancelling stages is read as signal output to an output buffer 902, from which the signal samples can be further used for example in interference cancellation for another user group.

The means implementing the invention are preferably implemented by software, whereby the receiver in base station 100A to 100D comprises a microprocessor, the functionalities of the method described operating as software therein. The invention can also be implemented using hardware solutions offering the necessary functionality, for example ASIC (Application Specific Integrated Circuit) or separate logics components. It is obvious that the receiver also comprises other parts than those described for FIGS. 5 to 9, but their description is not essential for the invention.

Although the invention was described above with reference to the example according to the accompanying drawings, it is obvious that the invention is not restricted thereto, but can be modified in a variety of ways within the inventive idea disclosed in the attached claims.

What is claimed is:

1. A method of receiving a spread spectrum signal, comprising:

receiving a combination signal comprising user signals spread with various spreading codes;

generating samples from the received combination signal;

selecting a sample set including N successive samples, where N is an integer number of at least two;

reading from a sample memory one or more samples belonging to said sample set;

reading user signal estimates from a correlation memory, and correlating the samples using the spreading codes and the user signal estimates to generate improved user signal estimates;

generating sample estimates for the spread user signals corresponding to the sample by means of user signal estimates and the spreading codes;

synchronising the sample memory and the correlation memory in such a way that the user signal estimates are read from the correlation memory to the sample estimate generation stage substantially at the same time as the samples are read from the sample memory to the user signal estimate generation stage;

subtracting the generated sample estimates from the sample corresponding to them to generate a residual signal sample;

using the residual signal sample in the generation of specified user signal estimates to be used in a following sample estimate generation stage;

returning to said sample reading stage until all samples in the sample set that are necessary for generating the user signal estimates are processed;

generating final user signal estimates for M oldest samples in the sample set on the basis of the specified user signal estimates generated for them, where M is an integer of at least one; and removing M oldest samples from the sample set and returning to the sample set selection stage by selecting M new samples to the sample set of N samples in addition to the N−M samples belonging to the previous interference-cancelling stage.

2. A method as claimed in claim 1, wherein correlating the samples corresponding to one or more user signals in a detection stage before one or more interference-cancelling stages to generate first user signal estimates.

3. A method as claimed in claim 1, wherein using zeroes (0) as first user signal estimates before said one or more interference-cancelling stages.

4. A method as claimed in claim 1, wherein selecting, to each interference-cancelling stage, M new samples that, added to said N samples, form at least one new symbol from each user.

5. A method as claimed in claim 1, wherein N being a multiple k of M, said N samples including at least k−1 symbols from each user.

6. A method as claimed in claim 1, wherein N being at least two and M being at least N less one.

7. A method as claimed in claim 1, wherein receiving the combination signal in a RAKE type of CDMA receiver.

8. A method as claimed in claim 1, wherein cancelling, in said one or more interference-cancelling stages, multi-user interference from the received combination signal by utilizing parallel interference cancellation.

9. A method as claimed in claim 1, wherein replacing a sample with a residual signal sample in the sample memory after each interference-cancelling stage.

10. A method as claimed in claim 1, wherein replacing, after each user signal estimate correlation stage, the user signal estimates in the correlation memory with specified user signal estimates.

11. A method as claimed in claim 1, wherein removing from the sample set, in each interference-cancelling stage, M samples that are used to calculate the final values for the user signal estimates after said one or more interference-cancelling stages.

12. A method as claimed in claim 1, wherein after the interference-cancelling stages, a residual signal generated for M samples to be removed from sample set N constitutes the residual signal output.

13. A method as claimed in claim 1, wherein the user signal estimate is composed of a symbol estimate and a channel estimate.

14. A receiver for receiving a spread spectrum signal and comprising one or more antennas for receiving a combination signal, which comprises user signals spread with several spreading codes, a sampler for generating samples from the combination signal received, storing means for storing the generated samples in a sample memory comprised by the receiver, and an interference-cancelling unit for cancelling multi-user interference from the samples generated, wherein the interference-cancelling comprises:

means for selecting a sample set including N successive samples, where N is an integer of at least two;

means for reading one or more samples from the sample memory belonging to said sample set;

a correlation memory for storing user signal estimates;

one or more correlators arranged to use user signal estimates from the correlation memory and spreading codes in correlating of the samples;

one or more regenerators arranged to generate spread user signal sample estimates corresponding to the sample by means of the user signal estimates and spreading codes;

means for synchronizing the sample memory and the correlation memory in such a way that the user signal estimates are read from the correlation memory substantially at the same time as the samples are read from the sample memory;

one or more subtractors arranged to subtract from the sample corresponding sample estimates to generate a residual signal sample;

means for repeating the measures performed by the regenerator, subtractor and correlator on all samples in the sample set that are necessary for the generation of the user signal estimates;

means for generating final user signal estimates for M oldest samples in the sample set on the basis of the specified user signal estimates generated for them, where M is an integer of at least one;

means for removing M oldest samples from the sample set and means for selecting M new samples to the sample set of N samples; and means for repeating the measures performed by said means on a new sample set of N samples.

15. A receiver as claimed in claim 14, wherein the one or more correlators comprised by the interference-cancelling unit are arranged to correlate the samples corresponding to one or more user signals in a detection stage before one or more interference-cancelling stages to generate first user signal estimates.

16. A receiver as claimed in claim 14, wherein the one or more regenerators comprised by the interference-cancelling unit are arranged to use zeroes (0) as first user signal estimates before said one or more interference-cancelling stages.

17. A receiver as claimed in claim 14, wherein the interference-cancelling unit is arranged to select to each interference-cancelling stage M new samples, which, added to said N samples, generate at least one new symbol from each user.

18. A receiver as claimed in claim 14, wherein N is a multiple k of M, said N samples including at least k–1 symbols from each user.

19. A receiver as claimed in claim 14, wherein N is at least two and M is at least N less one.

20. A receiver as claimed in claim 14, wherein the receiver is a RAKE type of CDMA receiver.

21. A receiver as claimed in claim 14, wherein the receiver is arranged to cancel, in said one or more interference-cancelling stages, multi-user interference from the received combination signal by utilizing parallel interference cancellation.

22. A receiver as claimed in claim 14, wherein the receiver is arranged to replace a sample with a residual signal sample in the sample memory after each interference-cancelling stage.

23. A receiver as claimed in claim 14, wherein the receiver is arranged to replace, after each user signal estimate correlation stage, the user signal estimates in the correlation memory with specified user signal estimates.

24. A receiver as claimed in claim 14, wherein the receiver is arranged to remove from the sample set, in each interference-cancelling stage, M samples that are used to calculate the final values for the user signal estimates after said one or more interference-cancelling stages.

25. A receiver as claimed in claim 14, wherein after the interference-cancelling stages, a residual signal generated for M samples to be removed from sample set N constitutes the residual signal output.

26. A receiver as claimed in claim 14, wherein the user signal estimate is composed of a symbol estimate and a channel estimate.

\* \* \* \* \*